(12) United States Patent
Boyd et al.

(10) Patent No.: US 12,276,178 B2
(45) Date of Patent: Apr. 15, 2025

(54) CLUTCH APPARATUSES, SYSTEMS AND METHODS

(71) Applicant: FLOWCO PRODUCTION SOLUTIONS, LLC, Spring, TX (US)

(72) Inventors: Garrett S. Boyd, Granbury, TX (US); Mitchell A. Boyd, Haslet, TX (US)

(73) Assignee: FLOWCO PRODUCTION SOLUTIONS, LLC, Spring, TX (US)

( * ) Notice: Subject to any disclaimer, the term of this patent is extended or adjusted under 35 U.S.C. 154(b) by 114 days.

(21) Appl. No.: 17/900,206

(22) Filed: Aug. 31, 2022

(65) Prior Publication Data

US 2024/0068326 A1 Feb. 29, 2024

(51) Int. Cl.
| | |
|---|---|
| *E21B 34/06* | (2006.01) |
| *E21B 43/12* | (2006.01) |
| *F04B 47/12* | (2006.01) |
| *F16D 63/00* | (2006.01) |

(52) U.S. Cl.
CPC ............ *E21B 34/06* (2013.01); *E21B 43/121* (2013.01); *F16D 63/008* (2013.01); *F04B 47/12* (2013.01)

(58) Field of Classification Search
CPC .......... E21B 34/06; E21B 34/08; E21B 34/14; E21B 43/121; E21B 43/123; E21B 19/10; F04B 47/12; F16D 63/008
USPC .......................................................... 188/67
See application file for complete search history.

(56) References Cited

U.S. PATENT DOCUMENTS

| | | | |
|---|---|---|---|
| 9,869,401 B1* | 1/2018 | Boyd | E21B 43/121 |
| 2013/0048315 A1* | 2/2013 | VanLue | E21B 33/1291 |
| | | | 166/387 |
| 2016/0010436 A1* | 1/2016 | Boyd | E21B 43/121 |
| | | | 166/105 |

\* cited by examiner

*Primary Examiner* — Richard M Lorence
(74) *Attorney, Agent, or Firm* — Jason P. Mueller; FisherBroyles, LLP

(57) ABSTRACT

A clutch mechanism that can be used in various tools and mechanisms for holding a movable shaft in one or more preferred positions includes a clutch ring that surrounds the shaft. An interior diameter of the clutch ring is configured to closely surround and grasp one or more holding portions of the shaft. The clutch ring is configured such that the clutch ring can elastically deform to allow the shaft to move relative to the clutch ring. The clutch ring can take the form of a generally cylindrical sidewall. Openings may be formed through a thickness of the cylindrical sidewall to make it easier for portions of the clutch ring to elastically deform, thereby allowing the shaft to move relative to the clutch ring.

25 Claims, 14 Drawing Sheets

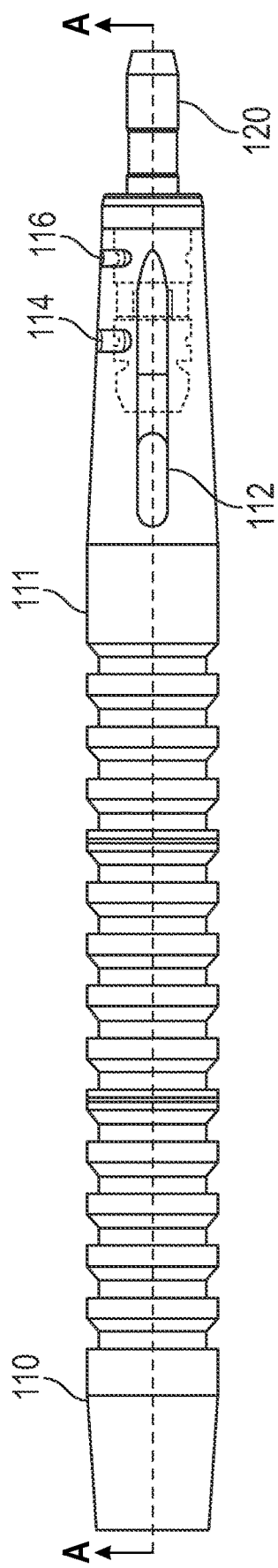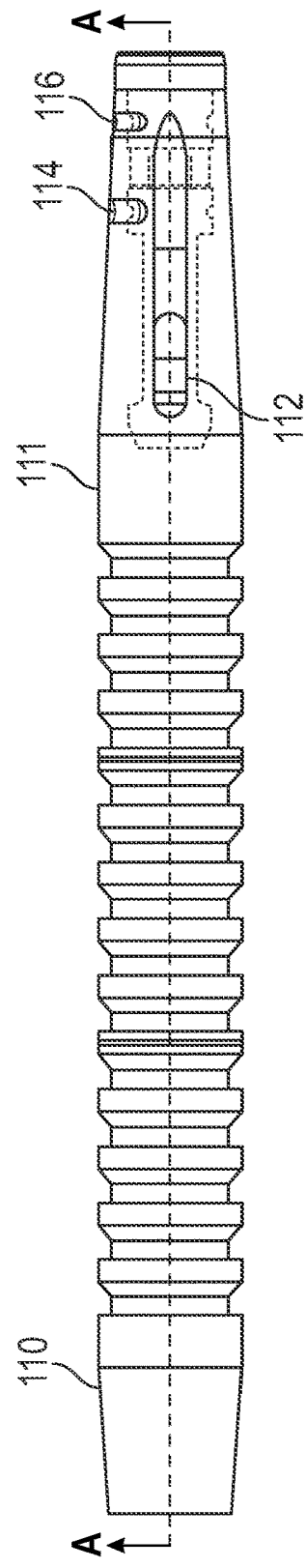
FIG. 1A
FIG. 1B

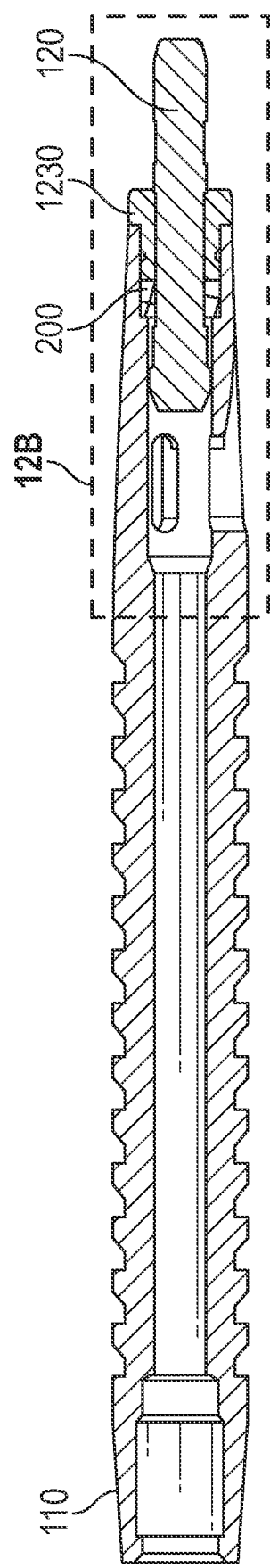
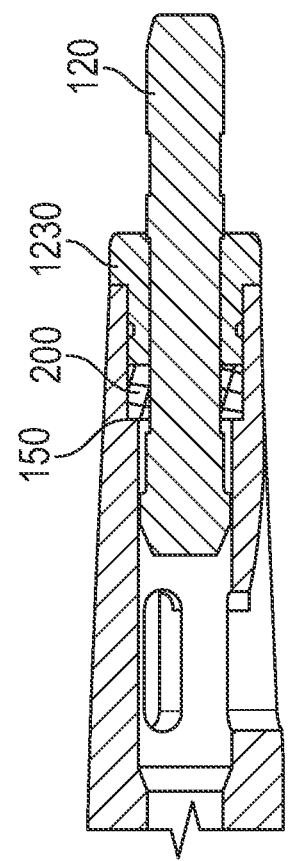
FIG. 12A
FIG. 12B

CLUTCH APPARATUSES, SYSTEMS AND METHODS

BACKGROUND OF THE INVENTION

The present disclosure relates to a clutch mechanism that can be used in various tools, devices and industrial applications. The clutch mechanism has particular applicability to downhole tools used in the oil and gas industry, where the downhole tool includes a body, a movable shaft mounted on the body and a clutch mechanism that is configured to hold the shaft in two or more preferred positions on the body.

BRIEF DESCRIPTION OF THE DRAWINGS

The accompanying drawings are part of the present disclosure and are incorporated into the specification. The drawings illustrate examples of embodiments of the disclosure and, in conjunction with the description and claims, serve to explain various principles, features, or aspects of the disclosure. Certain embodiments of the disclosure are described more fully below with reference to the accompanying drawings. However, various aspects of the disclosure may be implemented in many different forms and should not be construed as being limited to the implementations set forth herein.

FIG. 1A is a side view of a downhole tool according to the present disclosure where a movable shaft of the downhole tool is in a first position that is partially extended from an end of the downhole tool.

FIG. 1B a side view of the downhole tool of FIG. 1 where the movable shaft of the downhole tool is in a second position that is second retracted position.

FIG. 12A is a cross-sectional view of another embodiment of a downhole tool according to the disclosed technology which incorporates a shoulder in the downhole tool body to help mount and position a clutch ring.

FIG. 12B is a cross-sectional view of a portion of the downhole tool illustrated in FIG. 12A as identified by box 12B in FIG. 12A.

DETAILED DESCRIPTION OF THE INVENTION

Figure 2A:
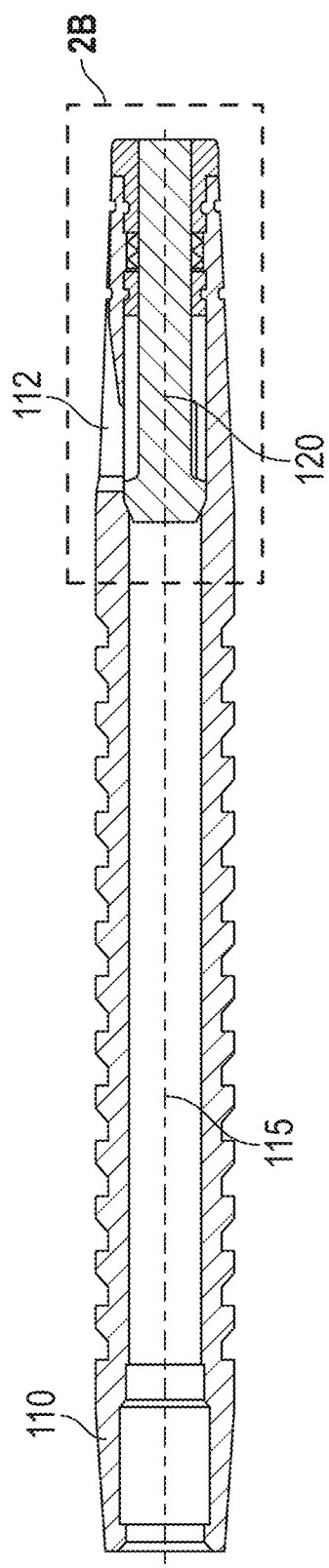
FIG. 2A is a cross-sectional view taken along cross-section line A-A of FIG. 1B where the shaft is in the second retracted position.

As mentioned above, a clutch mechanism as disclosed herein could be used in many different devices and tools. One class of tools or devices in which the disclosed clutch mechanism could be used are downhole tools used in oil and gas production. Many such downhole tools have movable shafts and require some sort of clutch mechanism to hold the shaft in one or more positions relative to the body of the downhole tool. The following description uses a bypass plunger as an example of a downhole tool that could be fitted with the disclosed clutch mechanism. However, bypass plungers are only one of many different downhole tools which could utilize a clutch mechanism as disclosed herein. Further, a clutch mechanism as disclosed herein could be used in a variety of other tools and devices beyond downhole tools and well beyond oil and gas production. Thus, the following description should in no way be considered limiting.

A bypass plunger is a device that is configured to freely descend and ascend within a well tubing, typically to restore production to a well having insufficient pressure to lift the fluids to the surface. It may include a self-contained valve—also called a "dart" or a "dart valve" in some embodiments—to control the descent and ascent. Typically the valve is opened to permit fluids in the well to flow through body of the plunder, the valve and vent passages in the plunger body as the plunger descends through the well. Upon reaching the bottom of the well, the valve is closed, which blocks flow of fluid through the body of the plunger. This converts the plunger into a piston that essentially blocks the well bore. With the plunger converted to a piston, blocking the upward flow of fluids or gas, the residual pressures in the well gradually increase the pressure in the fluid below the plunger until enough pressure builds up to cause the plunger to rise within the well bore. This also has the effect of causing the volume of fluid above the plunger to be lifted toward the surface. As the plunger rises through the well, the fluid above the plunger passes through a conduit for recovery. When the plunger itself reaches the top of the well, it hits a striker mechanism which causes the valve in the plunger to open. With the valve opened, allowing fluid to once again flow through the body of the plunger, the plunger is free to descend through the well and repeat the cycle.

In a typical bypass plunger the valve is similar to a poppet valve, with a valve head attached to one end of a valve stem. The valve head is configured to contact a valve seat within the hollow body of the plunger to close the valve. The valve stem can move backward within the body of the plunger to remove the valve head from the valve seat, thereby opening the valve so that fluid can pass though the interior of the body of the plunger. The stem extends toward the back end of the plunger, and when the valve is in the open position the rear end of the value stem protrudes out from the bottom end of the plunger body. When the plunger hits a bumper assembly at the bottom of the well, the valve stem is pushed into the body of the plunger, causing the valve head to contact the valve seat on the plunger body, thereby closing the valve.

A clutch device may surround the stem of the valve to control the motion of the stem and also to hold the valve in the open and closed positions. The clutch holds the valve in the open position during the descent of the plunger. The clutch holds the valve in the closed position during ascent of the plunger. Descent of the plunger is controlled by gravity, which pulls it toward the bottom of the well when the valve is open. Based on characteristics of the well and the design of the plunger, fall speeds of the plunger within the well tubing will vary. If descent of the plunger is slow, shut-in or non-production time of the well may increase and production may be lost or delayed. However, if the descent of the plunger is too fast, the downhole bumper assembly and/or the plunger may be damaged when the plunger reaches the bottom of the well. Typically, multiple designs and configurations of plungers must be manufactured and/or kept in stock to accommodate the various and changing conditions of the well.

The clutch mechanism typically exerts circumferential friction around the valve stem to hold the valve stem or "dart" in the open and closed positions. The head and an upper portion of the valve stem may be held within a hollow cage located at the rear of the plunger body. A threaded retainer or end nut secured to the rear of the plunger body holds the valve stem in the body while allowing the valve stem to move forward and rearward to close and open the valve.

One type of clutch mechanism used in a plunger is formed of a bobbin split into two hemispherical halves and surrounded by one or two ordinary coil springs that function as a sort of garter to clamp the stem of the valve or dart between the two halves of the bobbin, thereby resisting the sliding motion of the stem within the bobbin. The clutch assembly is typically held in a fixed position within the plunger body. Each 'garter' spring is wrapped around a corresponding external groove on the bobbin halves and the ends of the spring are crimped together. The crimping of the springs is typically in a hand operation that is subject to some variability. As a result, the tension each spring exerts around the bobbin halves can be variable. Also, such a crimped joint can fail. All these factors affect the repeatability and reliability of the clutch when in a downhole environment. Further, it is necessary to separately manufacture all the parts of the split bobbin clutch and to then assemble each bobbin clutch by hand. These factors increase the cost and time required to assemble a plunger.

Details of a plunger that incorporates a split bobbin clutch are disclosed in U.S. Pat. No. 9,869,401, the entire contents of which are incorporated herein by reference.

While generally effective in lifting accumulated fluids and gas of unproductive wells conventional bypass plungers tend to be complex and suffer from reliability problems because of an operating environment that subjects them to high impact forces, very caustic fluids, elevated temperatures and the like. One of the items that can fail is the clutch mechanism.

A clutch mechanism as disclosed herein can be used instead of a split bobbin clutch in plungers and other downhole tools. The disclosed clutch designs are more simple, have fewer parts and generally do not require any sort of assembly before being installed in a tool. As a result, it is easier, faster and less expensive to assembly a plunger or downhole tool incorporating the disclosed clutch designs. Also, because there are fewer moving parts and the parts are more robust, a plunger incorporating the disclosed clutch designs is more reliable, less prone to failure and tends to have a longer life than plungers incorporating a split bobbin clutch.

A plunger 110 incorporating the disclosed clutch design is illustrated in FIGS. 1A, 1B, 2A and 2B. As shown therein, the plunger 110 includes a unitary body 111. A valve stem 120 is mounted in a valve cage at the rear of the unitary body 111. FIG. 1A shows the plunger when the valve stem 120 is being held in the open position so that fluid can flow through an internal passageway 115 extending down the length of the body and through vent holes 112 that are positioned around the valve cage. As can be seen in FIG. 1A, when the valve is in the open position the rear of the valve stem 120 protrudes from the rear of the body 111.

Figure 2B:
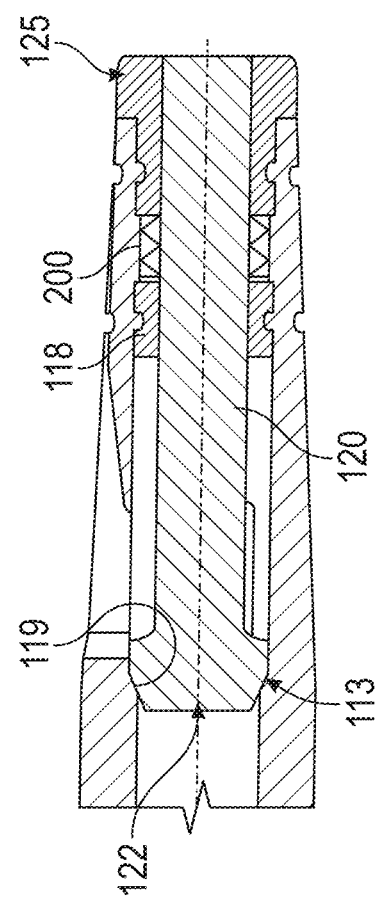
FIG. 2B is a partial cross-sectional view showing an enlarged view of the end of the downhole tool.

FIGS. 1B, 2A and 2B show the valve stem 120 when it is held in the closed position. As shown in FIG. 1B, when the valve in the closed position, the valve stem 120 is inside the body 111. As illustrated in FIG. 2B, the head 122 of the valve stem 120 engages a valve seat 113 on the body 111 to close the valve. A mating surface 119 on the valve head 122 is configured to seal against the valve seat 113 on the body 111.

FIG. 2B also illustrates a clutch ring 200 that is located within the body 111 of the plunger 110 and which holds the valve stem 120 in the open and closed positions. The clutch ring 200 is held between a partition nut 118 and an end nut 125. The partition nut 118 and the end nut 125 have external threads that mate with internal threads on the body 111 of the plunger 110. Also, the partition nut 118 and end nut 125 may be secured to the body 111 via a "crimple" 114, 116 formed in on the body 111. Each crimple is an inward-formed dent that effectively indents the wall of the body 111 into a corresponding relief machined into the external threads of the partition nut 118 and end nut 125.

The end nut 125 functions to close the open end of the valve cage and retain the valve stem 120 within the valve cage. The crimples 114, 116 eliminate the need for separate parts such as pins, screws, ball detents, lock nuts or washers, etc, to lock a threaded joint from loosening. The advantage of the crimple technique and mechanism is to more reliably prevent the inadvertent disassembly of the components secured to the bypass plunger with screw threads, thereby ensuring a true unibody bypass plunger that remains a single unit throughout many cycles of use.

Figure 3A:
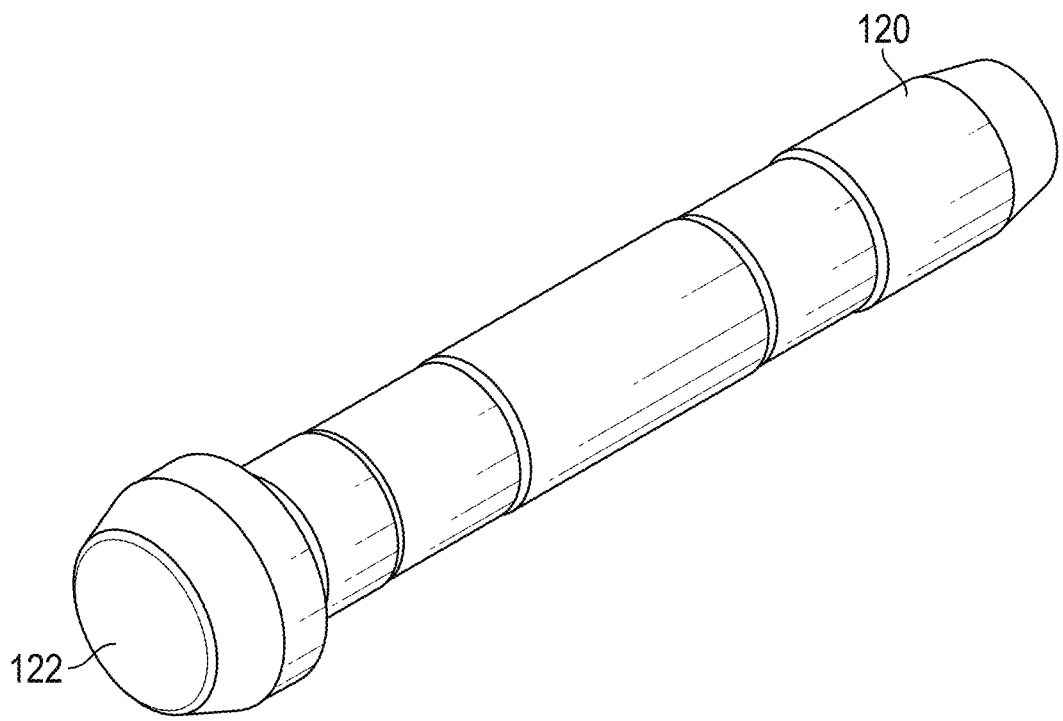
FIG. 3A is a perspective view of a movable shaft that can be incorporated into a downhole tool.
Figure 3B:
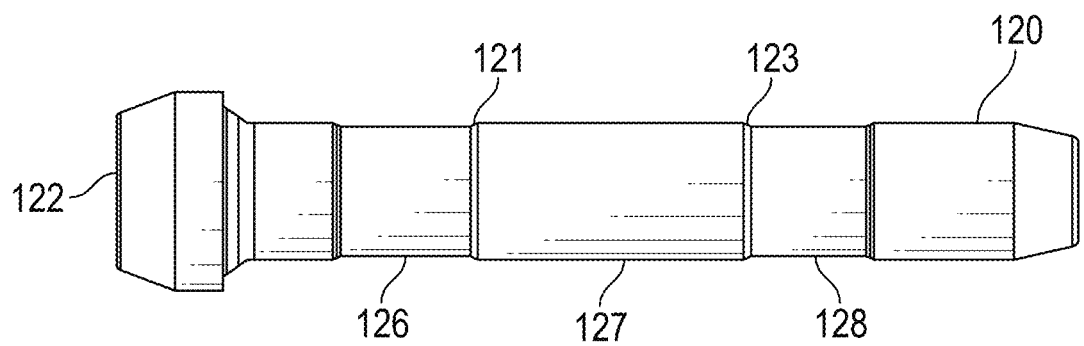
FIG. 3B is a side view of the movable shaft illustrated in FIG. 3A.
Figure 4A:
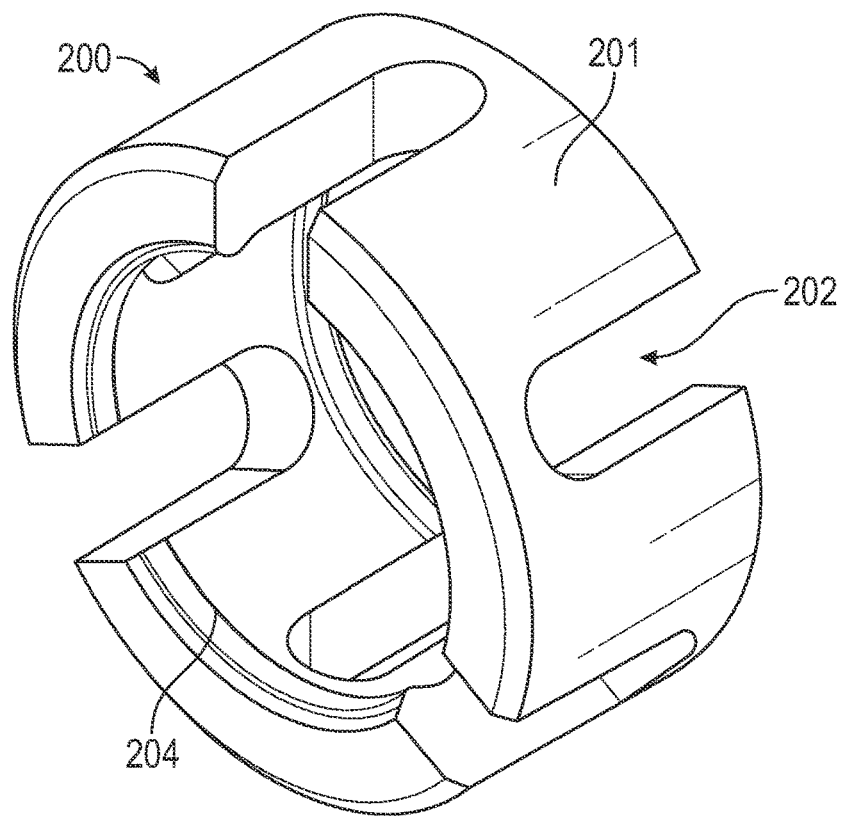
FIG. 4A is a perspective view of a clutch ring that can be used in a downhole tool such as the one depicted in FIGS. 1A and 1B.
Figure 4B:
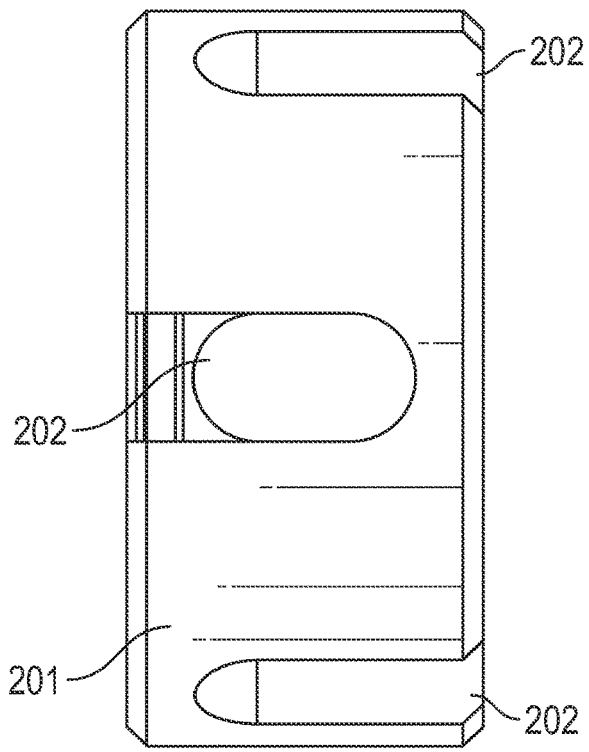
FIG. 4B is a side view of the clutch ring of FIG. 4A.
Figure 4C:
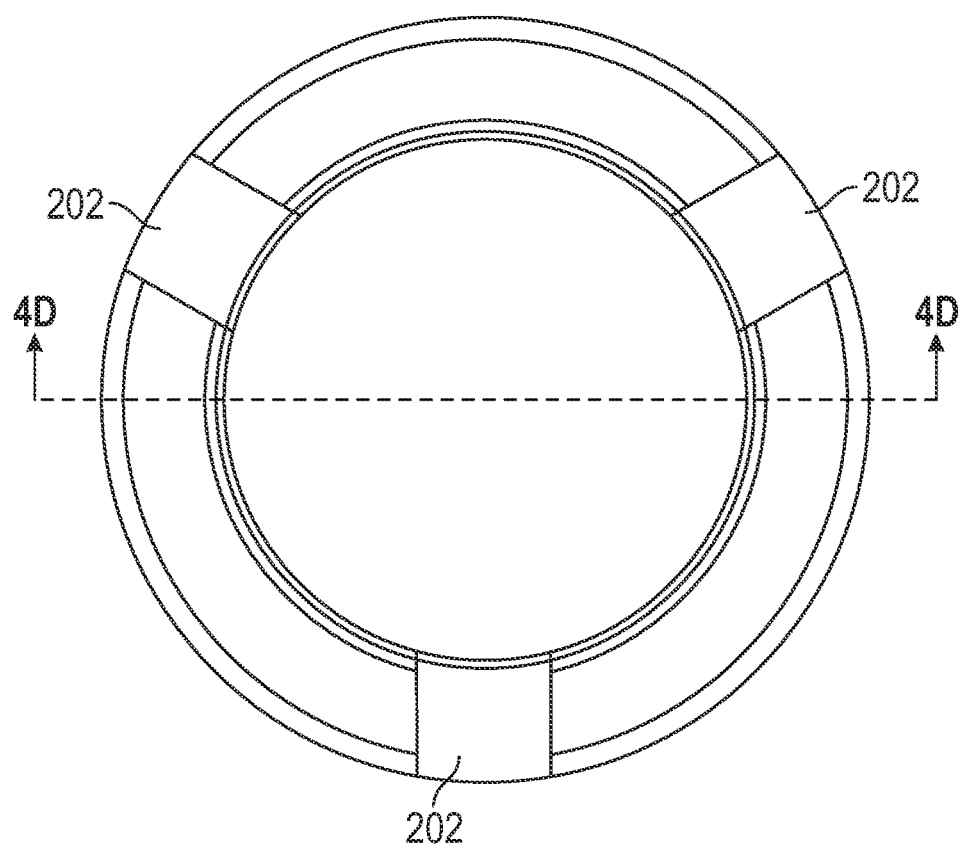
FIG. 4C is a top view of the clutch ring of FIG. 4A.
Figure 4D:
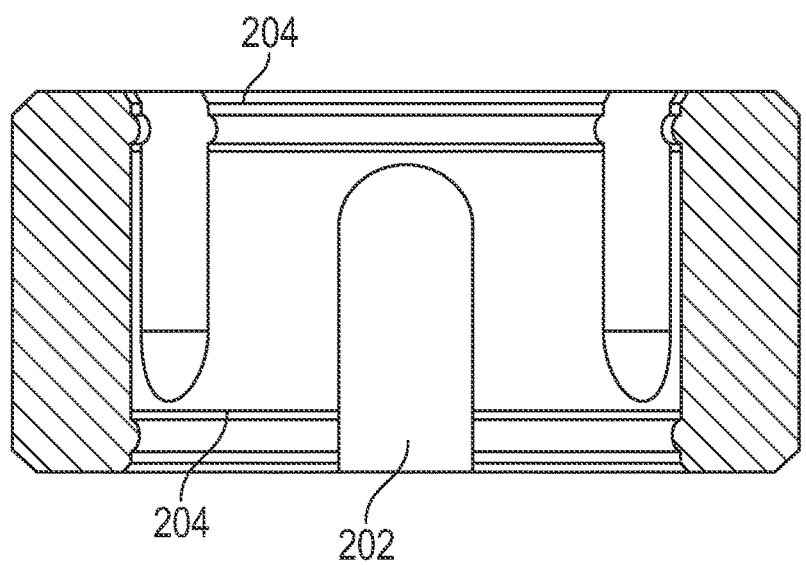
FIG. 4D is a cross-sectional view of the clutch ring taken along cross-section line 4D-4D of FIG. 4C.
Figure 4E:
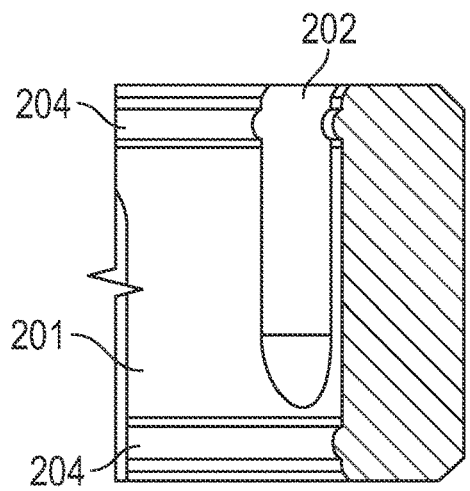
FIG. 4E is an enlarged partial cross-sectional view illustrating a portion of the clutch ring.

One embodiment of a clutch ring 200 that can operate to hold a valve stem 120 in the open and closed positions is illustrated in FIGS. 4A-4E. The clutch ring is designed to cooperate with features on the valve stem 120. An embodiment of a valve stem 120 that can be used with a clutch ring 200 as illustrated in FIGS. 4A-4E is depicted in FIGS. 3A and 3B. As will be explained below, features on the valve stem 120 and features on the clutch ring 200 cooperate to control movements of the valve stem 120 and to hold the valve stem 120 at open and closed positions.

As illustrated in FIGS. 3A and 3B, a valve stem 120 can include a head having a surface 119 that is configured to mate with a valve seat 113 on the body of the plunger. The shaft of the valve stem 120 includes a first holding portion 126, an intermediate portion 127 and a second holding portion 128. The outer surface of the first holding portion 126 and the outer surface of the second holding portion 128 have an outer diameter that is smaller than an outer diameter of the intermediate portion. The outer diameter of the first holding portion may be the same as the outer diameter of the second holding portion, or the outer diameters may be different.

A first transition zone 121 is provided between the first holding portion 126 and the intermediate portion 127. The first transition zone 121 has an outer surface with outer diameter that varies between the second outer diameter where the first transition zone 121 meets the first holding portion 126 and the first outer diameter where the first transition zone 121 meets the intermediate portion 127.

A second transition zone 123 is located between the second holding portion 128 and the intermediate portion 127. The second transition zone 123 has an outer surface with outer diameter that varies between the third outer diameter where the second transition zone 123 meets the second holding portion 128 and the first outer diameter wherein the second transition zone 123 meets the intermediate portion 127.

As illustrated in FIGS. 4A-4E, a clutch ring 200 can include a generally cylindrical sidewall 201. Openings 202 may be formed through a thickness of the sidewall 201. In the embodiment illustrated in FIGS. 4A-4E, six openings 202 are formed in the cylindrical sidewall symmetrically around a circumference of the cylindrical sidewall 201. Three of the six openings 202 extend from a first end of the cylindrical sidewall 201 part of the way toward a second end of the cylindrical sidewall 201. The remaining three of the openings 202 extend from the second end of the cylindrical sidewall 201 part of the way toward the first end of the cylindrical sidewall 201.

In alternate embodiments, as described below, different numbers of openings 202 could be formed in a clutch ring. Also, the dimensions and shapes of the openings can vary. All of these aspects of a clutch ring can be used to selectively vary the properties and performance of the clutch ring. For example, including a larger number of openings 202 or making the openings 202 larger will tend to make it easier to elastically deform the clutch ring 200.

In the embodiment illustrated in Figured 4A-4E there are two inwardly protruding rings 204 formed on the cylindrical inner surface of the clutch ring 200. The inwardly protruding rings 204 form a grasping portion that grasps an outer surface of a valve stem 120 to hold the valve stem 120 in preferred positions, as described below. In the embodiment illustrated in FIGS. 4A-4E the inwardly protruding rings 204 have a rounded or hemispherical profile. In alternate embodiments the inwardly protruding rungs could have other profiles. Also, alternate embodiments could include no inwardly protruding rings, only one inwardly protruding ring or more than two inwardly protruding rings 204.

When a valve stem 120 as illustrated in FIGS. 3A and 3B is mounted inside a clutch ring as depicted in FIGS. 4A-4E in a plunger 110 as illustrated in FIGS. 1A-2B, the clutch ring can hold the valve stem in the opened and closed positions. When the valve stem is in the open position, as depicted in FIGS. 1A, clutch ring 200 will surround the first holding portion 126 of the valve stem 120, with the inwardly protruding rings 204 of the clutch ring 200 resting on the outer surface of the first holding portion 126. Friction between the inwardly protruding rings 204 and the outer surface of the first holding portion 126 will help to hold the valve stem 120 in the closed position.

In order to move the valve stem 120 from the open to the closed position, it is necessary to move the valve stem 120 inward into the body 111 of the plunger 110. This requires that the inwardly protruding rings 204 of the clutch ring 200 slide along the exterior surface of the valve stem 120 from the first holding portion 126, along the intermediate portion 127 and then onto the second holding portion 128. For this to occur, the inwardly protruding rings 204 must expand slightly to accommodate the larger outer diameter of the intermediate portion 127 of the valve stem 120. This means the material of the clutch ring 200 must elastically deform as the inwardly protruding rings 204 ride outward along the first transition zone 121 located between the first holding portion 126 and the intermediate portion 127. Also, as the inwardly protruding rings 204 ride along the second transition zone 123 between the intermediate portion 127 and the second holding portion 128, the material of the clutch ring also will elastically deform as the inwardly protruding rings retract inward over the smaller diameter of the second holding portion 128.

Because the material of the clutch ring 200 must elastically deform to move from the smaller diameter of the first and second holding portions 126, 128 to the larger diameter intermediate portion 127, the clutch ring tends to hold the valve stem in the open and closed positions.

By selectively varying the difference between the outer diameter of the intermediate portion 127 and the outer diameters of the first and second holding portions 126, 128, one can selectively vary the amount of force required to cause the valve stem 120 to move out of the open or closed positions. The larger the difference between the outer diameters, the more force it will require to move the valve stem 120 out of the open or closed positions. One also can make it harder to move the valve stem 120 out of one position relative to the other position by making the outer diameters of the first and second holding portions 126, 128 different. For example, if the outer diameter of the first holding portion 126 is smaller than the outer diameter of the second holding portion 128, it will be harder to move the valve stem out of the open position toward the closed position than it will be to move the valve stem 120 from the closed position to the open position.

Similarly, the length of the first and second transition zones 121 and 123 can be selectively varied to vary the forces required to move the valve stem 120 out of the open and closed positions. The shorter a transition zone in the longitudinal direction of the valve stem 120, the steeper the surface will be between the holding portion of the intermediate portion 121. The steeper the surface, the more force is required to move the valve stem 120 out of a particular position. Conversely, if an intermediate zone is longer, the surface of the transition zone will have a more shallow angle, which will result in a lower amount of force being required to move the valve stem out of a particular position.

Figure 5A:
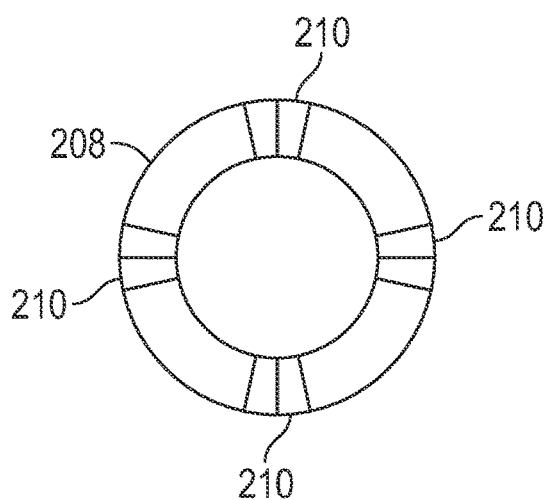
FIGS. 5A and 5B are top and side views, respectively, of an alternate embodiment of a clutch ring.
Figure 5B:
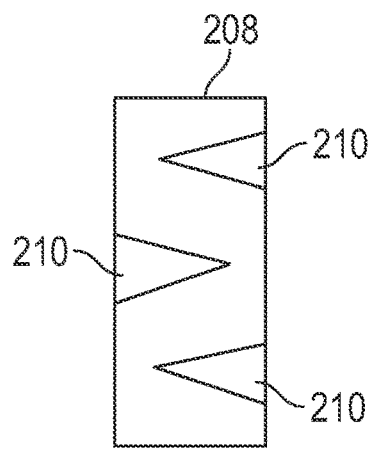

FIGS. 5A and 5B illustrate an alternate embodiment of a clutch ring 200. In this embodiment, eight openings 210 are formed in the sidewall 208 of the clutch ring 200. Each of the openings 210 have a "V" shaped profile. Four of the openings 210 are formed so that they extend from a first end of the cylindrical sidewall 208 toward a second opposite end of the cylindrical sidewall 208. Four additional openings 210 are formed so that they extend from the second end of the cylindrical sidewall toward the first end of the cylindrical sidewall 208.

Figure 6A:
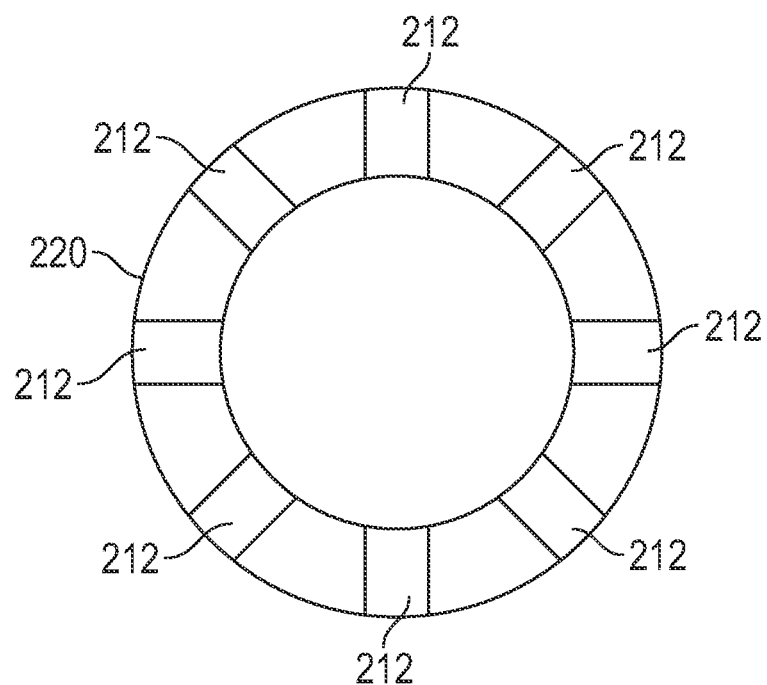
FIGS. 6A and 6B are top and side views, respectively, of another alternate embodiments of a clutch ring.
Figure 6B:
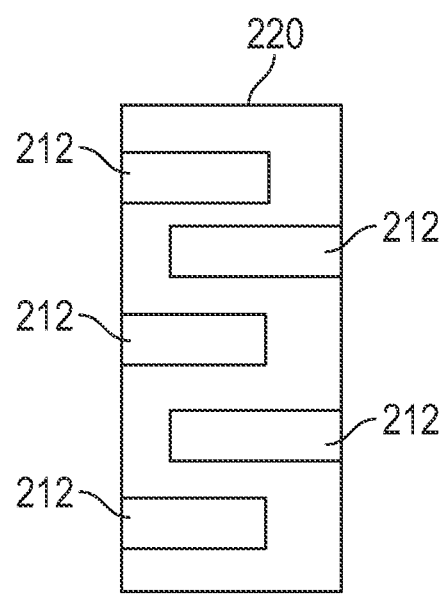

FIGS. 6A and 6B illustrate another alternate embodiment of a clutch ring 200. In this embodiment, sixteen openings 212 are formed in the sidewall 220 of the clutch ring 200. Each of the openings 212 have a rectangular-shaped profile. Eight of the openings 212 are formed so that they extend from a first end of the cylindrical sidewall 220 toward a second opposite end of the cylindrical sidewall 220. Eight additional openings 210 are formed so that they extend from the second end of the cylindrical sidewall 220 toward the first end of the cylindrical sidewall 220.

The embodiments illustrated in FIGS. 5A, 5B, 6A and 6B could potentially be easier to deform than the embodiment illustrated in FIGS. 4A-4E due to the greater number of openings. But only if all other aspects of the clutch ring are kept substantially the same. A large number of factors will determine just how flexible a clutch ring is, and thus how much force is required to move a valve stem mounted inside a clutch ring. They type of material used, the dimensions and thickness of the cylindrical sidewall, the shape, dimensions and numbers of openings all play a role in how easy it will be to deform a clutch ring.

A clutch ring could be formed of metal, synthetics such as thermoplastics or thermosets, elastomers and rubber materials and/or could be formed of two or more materials in a composite structure. The materials and dimensions would be selected for particular applications depending on the operating environment and the design requirements.

A clutch ring could be formed by molding or casting the clutch ring from a variety of materials. Alternatively, a clutch ring could be formed by additive or substrative processes, such as by machining of cylindrical section of material so that it takes on a desired shape.

FIGS. 7A-7D illustrate various different embodiments of a valve stem as a way to help explain how various aspects of the valve stem can be selectively varied to achieve different operating characteristics.

Figure 7A:
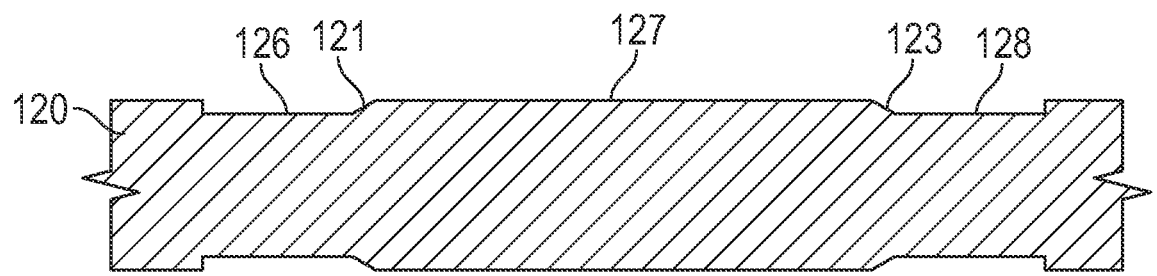
FIGS. 7A-7D illustrate various different configurations for a shaft of a downhole tool that is configured to interact with a clutch ring.

FIG. 7A illustrates a first embodiment of a valve stem 120 having a first holding portion 126, an intermediate portion 127 and a second holding portion 128. A first transition zone 121 is located between the first holding portion 126 and the intermediate portion 127 and a second transition zone 123 is located between the second holding portion 128 and the intermediate portion 127.

Figure 7B:
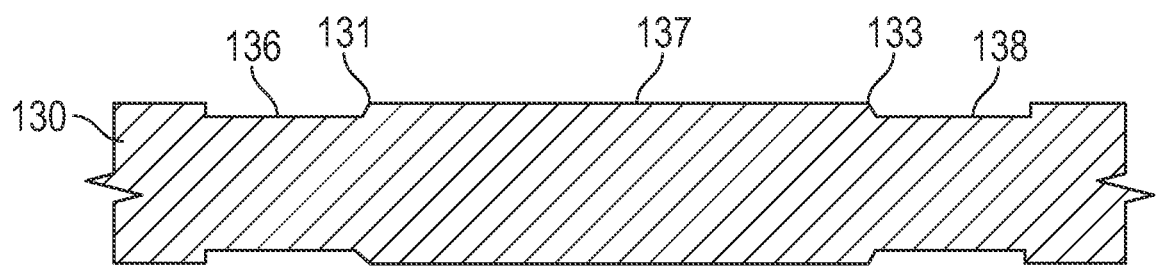

FIG. 7B illustrates a second embodiment of a valve stem 130 having a first holding portion 136, an intermediate portion 137 and a second holding portion 138. A first transition zone 131 is located between the first holding portion 136 and the intermediate portion 137 and a second transition zone 133 is located between the second holding portion 138 and the intermediate portion 137.

The first transition zone 121 and the second transition zone 123 in the first embodiment of the valve stem 120 are longer and have a more gradual sloped surface than the first transition zone 131 and second transition zone 133 of the second embodiment of the valve stem 130. As a result, and assuming the same clutch ring 200 is used, it would require more force to move the second embodiment of the valve stem 130 out of the open and closed positions than the first embodiment of the valve stem 120 as illustrated in FIG. 7A.

Figure 7C:
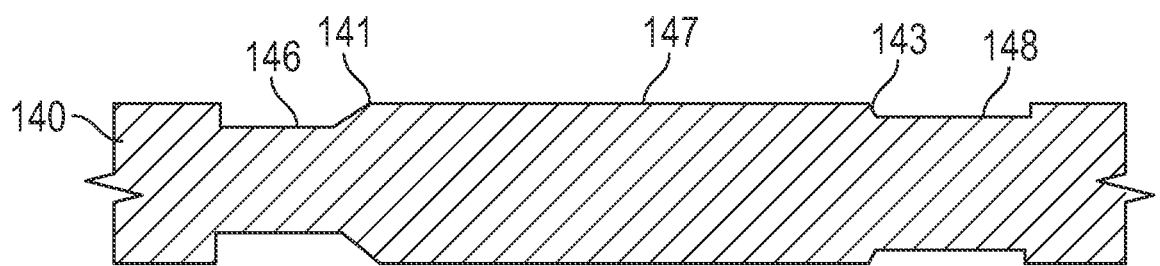

FIG. 7C illustrates a third embodiment of a valve stem 140 having a first holding portion 146, an intermediate portion 147 and a second holding portion 148. A first transition zone 141 is located between the first holding portion 146 and the intermediate portion 147 and a second transition zone 143 is located between the second holding portion 148 and the intermediate portion 147. In this embodiment, the outer diameter of the first holding portion 146 is smaller than the outer diameter of the second holding portion 148. As a result, it will be harder to move the valve stem 140 out of the open position and toward the closed position than it will be to move the valve stem 140 out of the closed position and toward the open position. This is the case because will require greater deformation of the clutch ring to move out of the open position and toward the closed position than it will be to move the valve stem 140 out of the closed position and toward the open position. Of course, this assumes that the clutch ring is configured such that it will deform inwardly to grasp the smaller diameter first holding portion 146, or at least that the clutch ring will deform more inwardly when positioned around the first holding portion 146 than when it is positioned around the second holding portion 148.

Figure 7D:
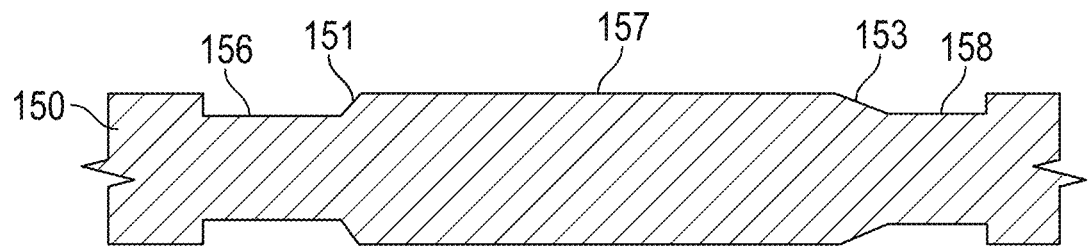

FIG. 7D illustrates a fourth embodiment of a valve stem 150 having a first holding portion 156, an intermediate portion 157 and a second holding portion 158. A first transition zone 151 is located between the first holding portion 156 and the intermediate portion 157 and a second transition zone 153 is located between the second holding portion 158 and the intermediate portion 157.

In this fourth embodiment, the second transition zone 153 is considerably longer than the first transition zone 156. This fourth embodiment 150 could be used with a clutch ring that has a length that substantially matches the length of the first holding portion 156. Because the flat portion of the second holding portion 158 is shorter than this length, one end of the clutch ring will rest against the sloped surface of the second transition zone 153 when the clutch ring surrounds the second holding portion. This will have the effect to constantly urging the valve stem to the left in FIG. 7D, which means into the closed position. Thus, an embodiment as illustrated in FIG. 7D, where at least a portion of the clutch ring is designed to bear against a sloped surface of a transition zone, can be helpful in urging the valve stem in a particular direction, such as the closed position.

Figure 8A:
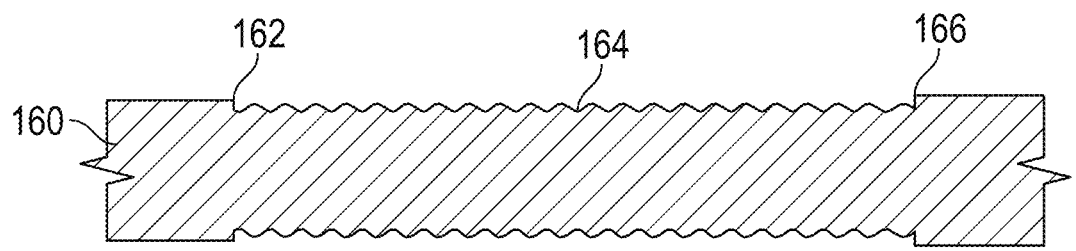
FIGS. 8A and 8B illustrate different configurations for a shaft of a downhole tool configured to interact with a clutch ring where the shaft includes circumferential rings of material.
Figure 8B:
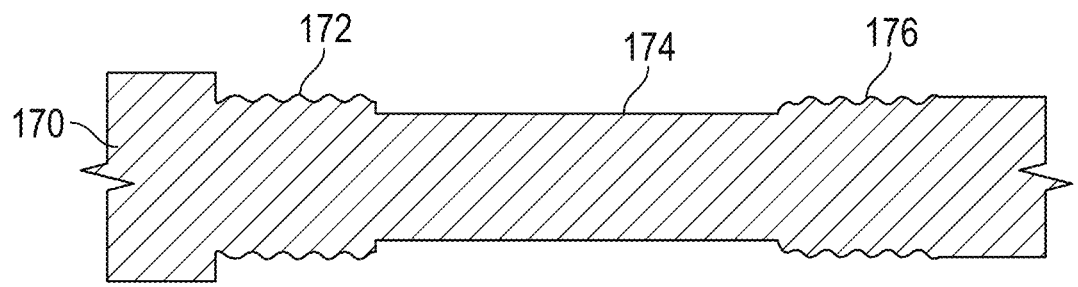

FIGS. 8A and 8B illustrate two alternate embodiments for a valve stem. In each of these embodiments, concentric rings are formed on portions of the outer surface of the valve stem. The concentric rings are configured to interact with the inwardly protruding rings 204 formed on the inner cylindrical surface of a clutch ring to help hold the valve stem in a certain position.

In the fifth embodiment of a valve stem 160 illustrated in FIG. 8A, circumferential rings 164 are formed along the length of the valve stem 160 between a first shoulder 162 and a second shoulder 166. This would allow the valve stem 160 to be held in any of a large number of positions. The only limitation on movement of the valve stem would be when an end of the clutch ring that surrounds the valve stem hits the first shoulder 162 when the valve is in the open position, and when an end of the clutch ring hits the second shoulder 166 as the valve moves towards the closed position.

The shape or profile of the outer surface of the valve stem 160 could take on any of a variety of shapes or profiles. Preferably, the shape or profile of the circumferential rings 164 on the outer surface of the valve stem would cooperate with the shape or profile of the inwardly protruding rings 204 on the inner cylindrical surface of the clutch ring that surrounds the valve stem to provide sufficient frictional force to hold the valve stem 160 in preferred positions.

FIG. 8B illustrates a sixth embodiments of a valve stem 170 that also includes circumferential rings formed at first and second locations along the length of the valve stem 170. A first set of circumferential rings formed a first holding position 172, and a second plurality of circumferential rings form a second holding portion 176. An intermediate portion 174 between the first holding portion 172 and the second holding portion 176 does not include circumferential rings and may have an outer diameter that is smaller than the outer diameter of the first and second holding portions 172, 176. In this embodiment, the circumferential rings on the first holding portion 172 and the second holding portion 176 are configured to cooperate with the shape or profile of the inwardly protruding rings 204 on the inner cylindrical surface of the clutch ring that surrounds the valve stem 170 to hold the valve stem 170 in the open and close positions. However, the smooth smaller diameter intermediate portion 174 will make it easy to move the valve stem 170 between the open and closed positions.

Figure 9A:
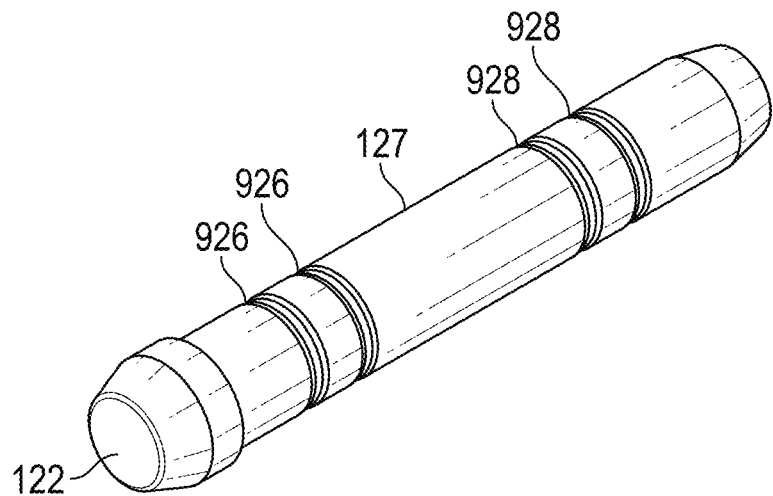
FIG. 9A is a perspective view of another embodiments of a movable shaft that can be incorporated into a downhole tool.
Figure 9B:
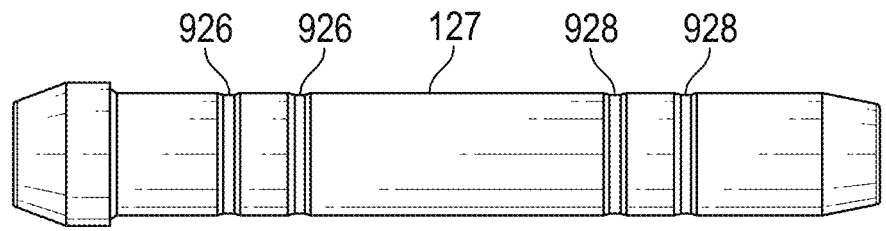
FIG. 9B is a side view of the movable shaft illustrated in FIG. 9A.

FIGS. 9A and 9B illustrate a seventh embodiment of a valve stem where each of the holding portions are formed by a pair of locking grooves. As shown in these figures, a first pair of locking grooves 926 form a first holding portion and a second pair of locking grooves 928 form the second holding portion. Each pair of locking grooves 926/928 is configured to receive corresponding inwardly protruding rings of the material 204 on the inner surface of a clutch ring 200. The embodiment illustrated in FIGS. 9A and 9B has two locking grooves forming each holding portion that are designed to cooperate with two inwardly protruding rings of material on a clutch ring 200 like the one illustrated in FIGS. 4A-4E. Thus, the locking grooves have a shape and depth designed to receive the corresponding inwardly protruding rings of material 204 on the clutch ring 200. Also, the two locking grooves 926 of the first holding portion and the two locking grooves 928 of the second holding portion are spaced apart the same distance as the inwardly protruding rings of material 204 on the clutch ring 200.

In alternate embodiments, a valve stem similar to the one illustrated in FIGS. 9A and 9B, which includes locking grooves to form the holding portions, could have only a single locking groove or more than two locking grooves at each holding portion. Preferably, the number, profile and locations of the locking grooves will be configured to match the number, profile and locations of corresponding inwardly protruding rings of material on the inner surface of a clutch ring.

Figure 10A:
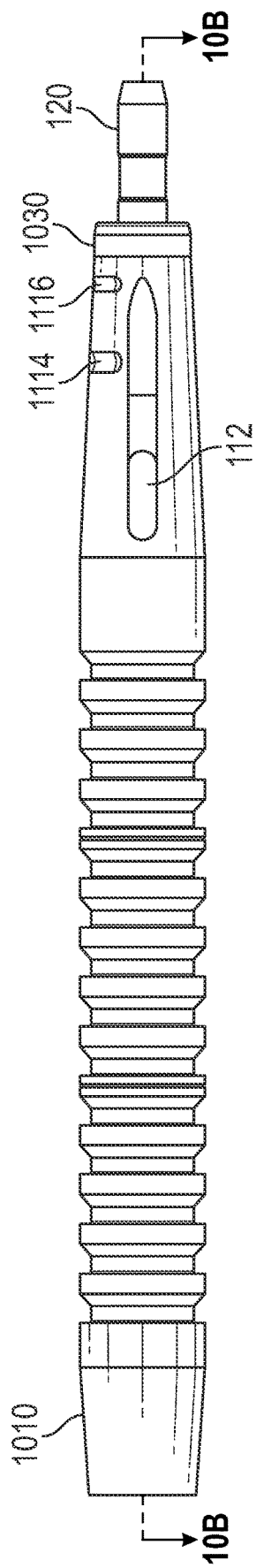
FIG. 10A is a side view of a downhole tool according to another embodiment of the disclosed technology.
Figure 10B:
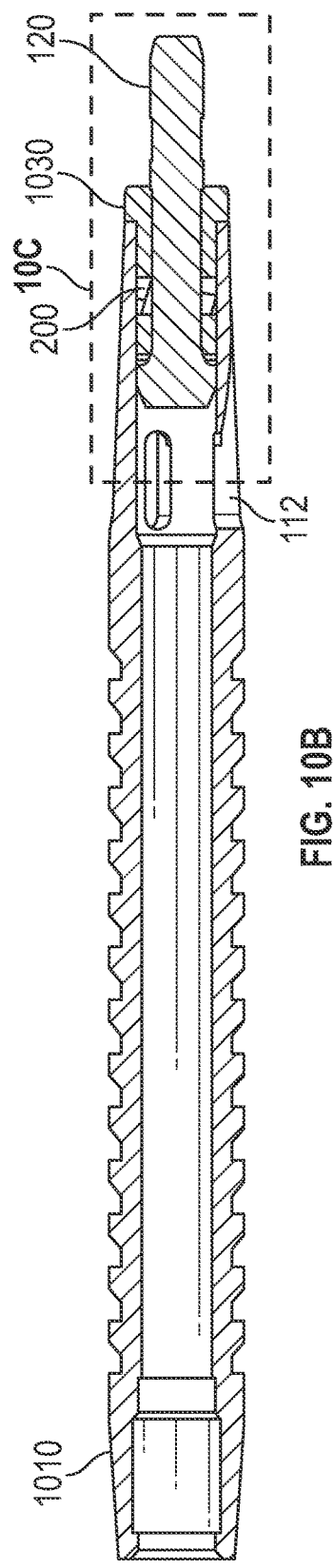
FIG. 10B is a cross-sectional view of the downhole tool illustrated in FIG. 10A taken along section line 10B-10B.
Figure 10C:
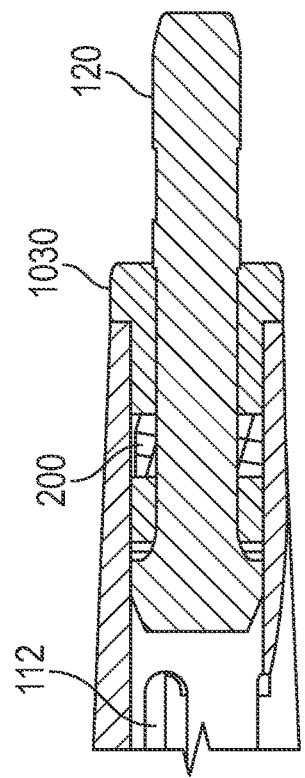
FIG. 10C is an enlarged section view of the portion of the downhole tool identified with box 10C in FIG. 10B.
Figure 11A:
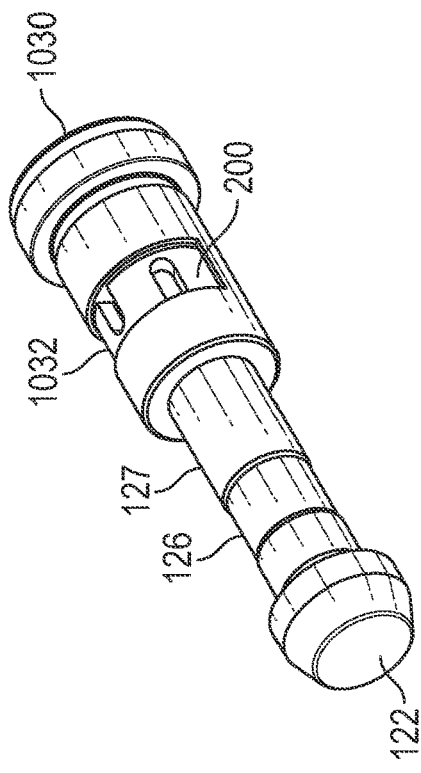
FIG. 11A is a top view of a movable shaft, clutch ring and end nut of a downhole tool according to an embodiment of the disclosed technology.
Figure 11B:
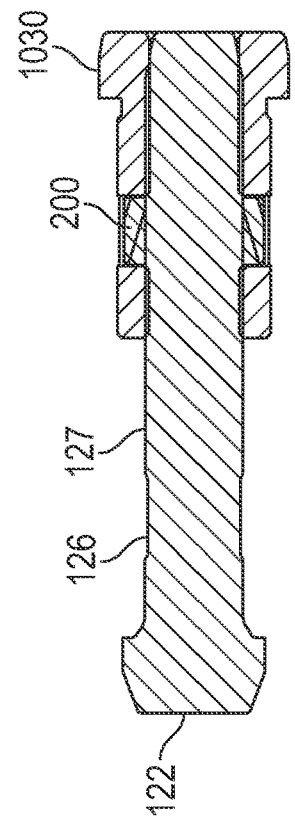
FIG. 11B is a perspective view of the assembly illustrated in FIG. 11A.
Figure 11C:
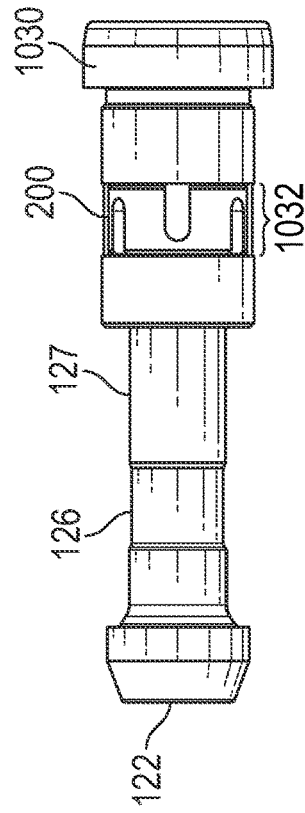
FIG. 11C is a side view of the assembly illustrated in FIGS. 11A and 11B.
Figure 11D:
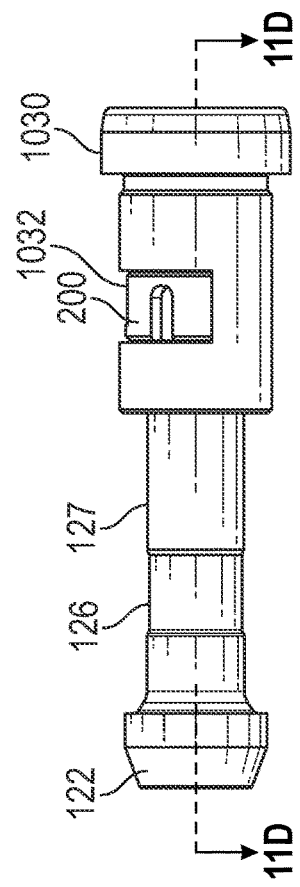
FIG. 11D is a cross-sectional view of the assembly illustrated in FIG. 11C taken along section line 11D-11D in FIG. 11C.

FIGS. 10A-10C and 11A-11D illustrate an alternate embodiment where the clutch ring 200 is mounted in an aperture formed in the end nut that is mounted to the end of the tool body. FIGS. 10A-10C illustrate a tool body 1010 that includes an end nut 1030. A valve stem 120 is mounted in the end nut 1030. A clutch ring 200 is also mounted in the end nut 1030 such that the valve stem 120 passes through both the end nut 1030 and the clutch ring 200. As with the previously described embodiments, the valve stem 120 is free to move within the end nut 1030 to move between open and closed positions. The end nut 1030 can include external threads that cooperate with internal threads on the tool body 1010. Also, as with the previously described embodiments, crimples 1114, 1116 could be formed on the tool body 1010 to help fix the end nut 1030 to the tool body 1010.

As illustrated in FIGS. 11A-11D, an access opening 1032 can be formed on the end nut 1030. The access opening 1032 is essentially an opening in the cylindrical wall of the end nut 1030. The access opening 1032 extends approximately half way around the circumference of the cylindrical wall of the end nut 1030, and the access opening 1032 has a width that is larger than height of the clutch ring 200 so that the clutch ring 200 can be inserted into the access opening 1032.

To assemble what is illustrated in FIGS. 11A-11D, the clutch ring 200 is first inserted into the access opening 1032 of the end nut 1030. The valve stem 120 is then inserted such that the valve stem 120 passes though both the internal bore of the end nut 1030 and through the internal bore of the clutch ring 200. This entire assembly is then mounted in the end of the tool body 1010, as illustrated in FIGS. 10A-10C.

An embodiment as illustrated in FIGS. 10A-10C and 11A-11D does not require a separate partition nut 118 like the embodiment illustrated in FIGS. 2A and 2B of the application. This makes assembly of the tool less complex. Also, this eliminates any need to pay attention to the location of the partition nut 118 relative to the end nut 130, further eliminating a potential source of assembly error.

An embodiment as illustrated in FIGS. 10A-10C and 11A-11D could allow a manufacturer to make different end nuts 1030 having different sized access openings 1032. As a result, different clutch rings 200 having various different dimensions could be used in any given tool. For example, a tool body 1010 having the same dimensions could be configured to receive a variety of different end nuts 1030, each of which has a different sized access opening to receive different types of clutch rings 200. Thus, the characteristics of the clutch ring used on any given tool could be selectively varied to match the anticipated or desired operating conditions in which the tool will be used.

FIGS. 12A and 12B illustrate yet another embodiment in which the clutch ring 200 is mounted via another alternate means. In this embodiment, a shoulder 150 is formed on the interior surface of the tool body 110. The clutch ring 200 is positioned between this shoulder 150 and a traditional end nut 1230. As with the previous embodiments, the end nut 1230 could be affixed to the tool body 110 via threads and via one or more crimples.

An embodiment as illustrated in FIGS. 12A and 12B also eliminates the need for a partition nut, simplifying assembly and eliminating a potential source of assembly error. This embodiment also has the advantage of using a simplified end nut 1230 that does not require an access opening like the one illustrated in FIGS. 12A-12D.

Figure 13:
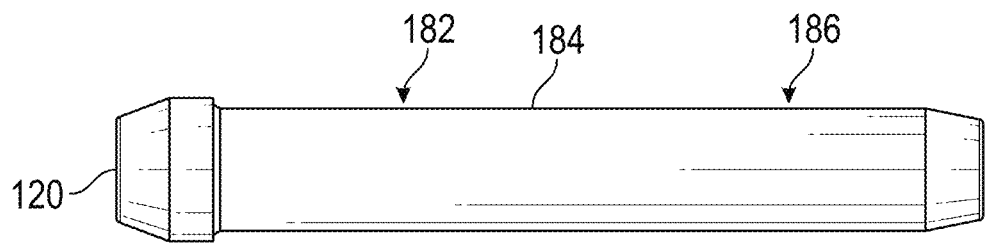
FIG. 13 is a side view of another embodiment of a movable shaft according to the disclosed technology.

FIG. 13 illustrates another embodiment of a valve stem 120 that could be used in conjunction with a clutch ring as described above. In this embodiment, the outer surface of the shaft of the valve stem is smooth, featureless and has a substantially constant outer diameter. The way in which the valve stem is mounted in a valve cage of the downhole tool allows the valve stem to move between first and second holding positions. When the valve stem is in a first holding position the clutch ring would surround a first holding portion 182 of the shaft. The valve stem could then move to a second holding position where the clutch ring surrounds the second holding portion 186 of the shaft. When the valve stem transitions between the first and second holding positions, the clutch ring would slide along the intermediate portion 184 of the shaft.

Figure 14:
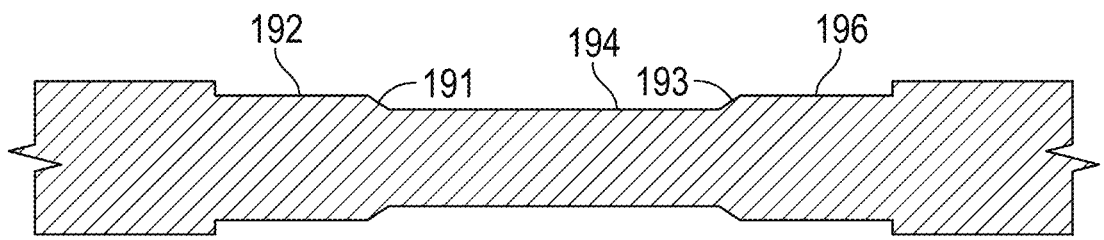
FIG. 14 is a cross-sectional view of a portion of a movable shaft of a downhole tool according to another embodiment of the disclosed technology.

FIG. 14 illustrates a portion of a shaft of another embodiment of a valve stem similar to the one illustrated in FIG. 13. In this embodiment, however, an outer diameter of the first holding portion 192 and the second holding portion 196 is greater than an outer diameter of the intermediate portion 194. As a result, when the clutch ring surrounds the first holding portion 192 or the second holding portion 196, the clutch ring will exert a greater grasping force on the shaft than when the clutch ring surrounds the intermediate portion 194 of the shaft. The greater grasping force exerted by the clutch ring when it surrounds the first holding portion 192 and the second holding portion 196 will serve to keep the valve stem in first and second holding positions. Also, the smaller amount of grasping force exerted when the clutch ring surrounds the intermediate portion 194 will make it easier for the valve stem to move between the first and second holding positions.

Of course, in alternate embodiments similar to the one illustrated in FIG. 14 the outer diameters of the first holding portion 192 and the second holding portion 196 may be different. This would result in the clutch ring exerting a greater grasping force at one of the first a second holding positions, to preferentially hold the valve stem in one of the first and second holding positions.

Likewise, the first transition zone 191 and the second transition zone 193 could be similar in profile, or one of the first and second transition zones 191,193 could have a shorter length and a more steep slope to also affect how difficult it is to move the valve stem into each of the first and second holding positions.

In the foregoing embodiments, a valve stem of a downhole tool is moved between open and closed positions. As a result, the valve stem has first and second holding portions that correspond to holding the valve stem at open and closed positions. When a clutch mechanism is used in connection with alternate tools or devices, only single holding portion may be provided, or more than two holding portions may be provided. Also, a single tool or device could incorporate only a single clutch ring, or multiple clutch rings could be provided. In some instances, multiple clutch rings could be mounted around a single movable shaft. Thus, the foregoing embodiments should in no way be considered limiting of the ways in which a clutch mechanism according to the disclosed technology can be configured and used.

Moreover, while the technology has been explained in connection with a downhole tool, the use of one or more clutch rings to hold a shaft at one or more preferred positions has applications that go well beyond downhole tools. Clutch mechanisms as described could be used in a large variety of other contexts in machinery and tools used for virtually any purpose.

While exemplary embodiments of the disclosure have been shown, the disclosure is not limited and various changes and modifications may be made without departing from the spirit thereof. For example, canted-coil springs may be used to advantage in split bobbin clutches as described herein. Further, the profiles of the helical grooves and the flow ports in the cage, the surface finishes, the relative placements of the canted coil spring within the retaining nut attached to the cage, the form of the poppet valve—its stem, valve head, and the corresponding valve seat in the plunger body, the number of canted coil springs used within the retaining nut or in a split bobbin clutch assembly, the shape of the crimple and the die used to form it, are some illustrative examples of variations that fall within the scope of the disclosure. Moreover, the crimple feature is a technique that may be used in place of set screws, pins, etc., to secure threaded components from turning relative to each other. For example, end nuts at either end of a plunger body or a bumper spring or other similarly constructed device, may employ a crimple as described herein to useful advantage. The canted-coil spring used as a clutch may also be used in other structures for controlling sliding or reciprocating motion of a shaft within the bore of a corresponding structure of a device.

In regard to the use of a canted-coil spring in a clutchless embodiment of a valve dart assembly, several of the disclosed embodiments may use split bobbin clutch assemblies in the claimed combinations, wherein canted-coil springs or conventional coil springs may be used to hold the bobbin halves together around the stem of the valve dart, without departing from the concepts of the disclosure as disclosed herein.

Conditional language, such as, "can," "could," "might," or "may," unless specifically stated otherwise, or otherwise understood within the context as used, is generally intended to convey that certain implementations could, but do not necessarily, include certain features and/or elements while other implementations may not. Thus, such conditional language generally is not intended to imply that features and/or elements are in any way required for one or more implementations or that one or more implementations necessarily include these features and/or elements. It is also intended that, unless expressly stated, the features and/or elements presented in certain implementations may be used in combination with other features and/or elements disclosed herein.

The specification and annexed drawings disclose example embodiments of the present disclosure. Detail features shown in the drawings may be enlarged herein to more clearly depict the feature. Thus, several of the drawings are not precisely to scale. Additionally, the examples illustrate various features of the disclosure, but those of ordinary skill in the art will recognize that many further combinations and permutations of the disclosed features are possible. Accordingly, various modifications may be made to the disclosure without departing from the scope or spirit thereof. Further, other embodiments may be apparent from the specification and annexed drawings, and practice of disclosed embodiments as presented herein. Examples disclosed in the specification and the annexed drawings should be considered, in all respects, as illustrative and not limiting. Although specific terms are employed herein, they are used in a generic and descriptive sense only, and not intended to the limit the present disclosure.

What is claimed is:

1. A tool comprising:
   a body;
   a shaft having at least an intermediate portion with an outer surface having a first outer diameter and a first holding portion having an outer surface with a second outer diameter than is smaller than the first outer diameter, wherein the shaft is slidably mounted on the body such that the shaft can move into and out of at least a first holding position relative to the body; and
   a one-piece, unitary clutch ring that is mounted on the body and that surrounds an outer surface of the shaft, the clutch ring comprising a generally cylindrical sidewall with a generally cylindrical inner surface, wherein a grasping portion is located on the cylindrical inner surface;
   wherein when the shaft is in the first holding position relative to the body, the grasping portion of the unitary clutch ring surrounds and grasps the first holding portion of the shaft in order to hold the shaft at the first holding position, and wherein the clutch ring is configured such that the clutch ring can elastically deform to allow the shaft to move relative to the body out of the first holding position; and wherein when the shaft moves out of the first holding position, the unitary clutch ring surrounds at least a part of the intermediate portion of the shaft.

2. The tool of claim 1, wherein at least one opening extends through a thickness of the sidewall.

3. The tool of claim 2, wherein the at least one opening reduces an amount of force required to cause the clutch ring to elastically deform relative to a force that would be required to cause the clutch ring to elastically deform if the at least one opening were not provided on the clutch ring.

4. The tool of claim 2, wherein the at least one opening comprise a plurality of openings that are arranged symmetrically around a circumference of the clutch ring.

5. The tool of claim 2, wherein the at least one opening comprises a plurality of kerf cuts formed in the circular sidewall, each kerf cut comprising an opening that extends from one end of the circular sidewall part of the way toward a second opposite end of the sidewall.

6. The tool of claim 5, wherein the plurality of kerf cuts comprise:
a first plurality of kerf cuts that extend from a first end of the circular sidewall partially toward a second end of the circular sidewall; and
a second plurality of kerf cuts that extend from the second end of the circular sidewall partially toward the first end of the circular sidewall.

7. The tool of claim 6, wherein individual ones of the first and second plurality of kerf cuts alternate with each other around a circumference of the circular sidewall.

8. The tool of claim 1, wherein the grasping portion of the clutch ring comprises at least one inwardly protruding ring located on the cylindrical inner surface of the clutch ring.

9. The tool of claim 1, wherein the grasping portion of the clutch ring comprises first and second inwardly protruding rings located on the cylindrical inner surface of the clutch ring, the first inwardly protruding ring being located adjacent a first end of the clutch ring, the second inwardly protruding ring being located adjacent a second end of the clutch ring opposite the first end.

10. The tool of claim 9, wherein a portion of the inner surface of the clutch ring between the first and second inwardly protruding rings is substantially smooth and has an inner diameter that is greater than the inner diameters of the first and second inwardly protruding rings.

11. The tool of claim 10, wherein the first holding portion of the shaft includes a pair of locking grooves which are configured to receive the first and second inwardly protruding rings of the clutch ring.

12. The tool of claim 1, wherein the grasping portion comprises a plurality of inwardly protruding rings located on the cylindrical inner surface of the clutch ring.

13. The tool of claim 1, wherein the grasping portion of the clutch ring comprises a smooth cylindrical surface.

14. The tool of claim 1, wherein the shaft includes a second holding portion with an outer surface having a third outer diameter that is smaller than the first outer diameter and wherein when the shaft is in a second holding position relative to the body, the grasping portion of the unitary clutch ring surrounds and grasps the second holding portion.

15. The tool of claim 14, wherein the second outer diameter is substantially the same as the third outer diameter such that a force required to cause the shaft to move such that the portion of the shaft surrounded by the clutch ring changes from the first holding portion to the intermediate portion is substantially the same as a force required to cause the shaft to move such that the portion of the shaft surrounded by the clutch ring changes from the second holding portion to the intermediate portion.

16. The tool of claim 14, wherein the second outer diameter is smaller than the third outer diameter such that such that a force required to cause the shaft to move such that the portion of the shaft surrounded by the clutch ring changes from the first holding portion to the intermediate portion is greater than a force required to cause the shaft to move such that the portion of the shaft surrounded by the clutch ring changes from the second holding portion to the intermediate portion.

17. The tool of claim 14, wherein the shaft further comprises:
a first transition zone located between the first holding portion and the intermediate portion, the first transition zone having an outer surface with outer diameter that varies between the second outer diameter where the first transition zone meets the first holding portion and the first outer diameter wherein the first transition zone meets the intermediate portion; and
a second transition zone that is located between the second holding portion and the intermediate portion, the second transition zone having an outer surface with outer diameter that varies between the third outer diameter where the second transition zone meets the second holding portion and the first outer diameter wherein the second transition zone meets the intermediate portion.

18. The tool of claim 17, wherein the second outer diameter is approximately the same as the third outer diameter, and wherein a first length of the first transition zone in a longitudinal direction of the shaft is approximately equal to a second length of the second transition zone in the longitudinal direction such that a force required to cause the shaft to move such that the portion of the shaft surrounded by the clutch ring changes from the first holding portion to the intermediate portion is substantially the same as a force required to cause the shaft to move such that the portion of the shaft surrounded by the clutch ring changes from the second holding portion to the intermediate portion.

19. The tool of claim 17, wherein the second outer diameter is approximately the same as the third outer diameter, and wherein a first length of the first transition zone in a longitudinal direction of the shaft is smaller than a second length of the second transition zone in the longitudinal direction such that a force required to cause the shaft to move such that the portion of the shaft surrounded by the clutch ring changes from the first holding portion to the intermediate portion is greater than a force required to cause the shaft to move such that the portion of the shaft surrounded by the clutch ring changes from the second holding portion to the intermediate portion.

20. A tool comprising:
a body;
a shaft that is slidably mounted on the body, wherein a first plurality of protruding circumferential rings are provided on an outer surface of the shaft and are spaced along a length of a first holding portion of the shaft, the shaft also including an intermediate portion that is substantially free of protruding circumferential rings, wherein the outer surface of the shaft along the intermediate portion has a first outer diameter, and wherein an outer diameter of the first plurality of protruding circumferential rings along the first holding portion have a second outer diameter that is larger than the first outer diameter; and a one-piece, unitary clutch ring that is mounted on the body and that surrounds the outer surface of the shaft, the clutch ring comprising a generally cylindrical sidewall with a generally cylindrical inner surface, wherein a grasping portion is located on the cylindrical inner surface;

wherein when the shaft is in a first holding position relative to the body, the grasping portion of the unitary clutch ring surrounds and grasps the protruding circumferential rings on the first holding portion of the shaft in order to hold the shaft in the first holding position, and wherein the clutch ring is configured such that the clutch ring can elastically deform to allow the shaft to move relative to the body out of the first holding position; and wherein when the shaft moves out of the first holding position, the unitary clutch ring surrounds at least a part of the intermediate portion of the shaft.

21. The tool of claim 20, wherein a second plurality of circumferential rings are provided on the outer surface of the shaft and are spaced along a length of a second holding portion of the shaft.

22. The tool of claim 21, wherein an outer diameter of the second plurality of protruding circumferential rings along the second holding portion have a third outer diameter that is larger than the first outer diameter.

23. The tool of claim 22, wherein the second outer diameter is larger than the third outer diameter such that a force required to cause the shaft to move such that the portion of the shaft surrounded by the clutch ring changes from the first holding portion to the intermediate portion is greater than a force required to cause the shaft to move such that the portion of the shaft surrounded by the clutch ring changes from the second holding portion to the intermediate portion.

24. A tool comprising:

a body;

a shaft having at least a first holding portion, a second holding portion and an intermediate portion between the first holding portion and the second holding portion, wherein an outer diameter of the first holding portion and an outer diameter of the second holding portion is greater than an outer diameter of the intermediate portion, and wherein the shaft is slidably mounted on the body such that the shaft can move into and out of at least a first holding position relative to the body and a second holding position relative to the body; and a one-piece, unitary clutch ring that is mounted on the body and that surrounds an outer surface of the shaft, the clutch ring comprising a generally cylindrical sidewall with a generally cylindrical inner surface, wherein a grasping portion is located on the cylindrical inner surface, the grasping portion being configured to grasp the first holding portion of the shaft in order to hold the shaft at the first holding position and to hold the second holding portion to hold the shaft at the second holding position, wherein the clutch ring is configured such that the clutch ring can elastically deform to allow the shaft to move relative to the body.

25. The tool of claim 24, wherein a portion of the outer surface of the shaft that includes the first holding portion, the intermediate portion and the second holding portion is smooth and featureless.

* * * * *